United States Patent
Patel et al.

(10) Patent No.: US 10,225,787 B2
(45) Date of Patent: Mar. 5, 2019

(54) SYSTEM AND METHOD FOR ALTERNATE ACCESS PATHS IN A PUSH-TO-TALK (PTT) PLATFORM

(71) Applicant: Kodiak Networks Inc., Plano, TX (US)

(72) Inventors: Krishnakant M. Patel, Richardson, TX (US); Brahmananda R. Vempati, Dallas, TX (US); Ravi Ayyasamy, Plano, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 4 days.

(21) Appl. No.: 15/717,522

(22) Filed: Sep. 27, 2017

(65) Prior Publication Data

US 2018/0092026 A1 Mar. 29, 2018

Related U.S. Application Data (60) Provisional application No. 62/400,444, filed on Sep. 27, 2016.

(51) Int. Cl.
| | |
|---|---|
| *H04W 48/08* | (2009.01) |
| *H04L 1/00* | (2006.01) |
| *H04W 4/10* | (2009.01) |
| *H04W 8/24* | (2009.01) |
| *H04W 36/14* | (2009.01) |
| *H04W 36/30* | (2009.01) |
| *H04L 1/18* | (2006.01) |

(52) U.S. Cl.
CPC ........... *H04W 48/08* (2013.01); *H04L 1/0001* (2013.01); *H04L 1/0009* (2013.01); *H04W 4/10* (2013.01); *H04W 8/245* (2013.01); *H04W 36/14* (2013.01); *H04W 36/30* (2013.01); *H04L 1/0003* (2013.01); *H04L 1/0014* (2013.01); *H04L 1/1854* (2013.01)

(58) Field of Classification Search
CPC ...... H04W 48/08; H04W 36/32; H04M 15/49
See application file for complete search history.

(56) References Cited

U.S. PATENT DOCUMENTS

| | | | |
|---|---|---|---|
| 9,319,976 B2 | 4/2016 | Chen | |
| 9,386,497 B1* | 7/2016 | Sitaram | H04W 36/0083 |
| 2007/0275747 A1* | 11/2007 | Blicker | H04M 15/49 455/518 |
| 2009/0103450 A1* | 4/2009 | Peisa | H04L 1/0002 370/253 |
| 2010/0255836 A1 | 10/2010 | Chen | |

(Continued)

*Primary Examiner* — Myron Wyche (57) ABSTRACT

An embodiment method includes defining, by a server of a services platform, an access technology selection profile for a client on a client device. The access technology selection profile defines a priority order for selecting, by the client, at least one of a plurality of access technologies to access one or more telecommunications services provided by the services platform. The method further includes transmitting, by the server, the access technology selection profile to the client and providing, by the server, a first telecommunications service of the one or more telecommunications services to the client using a first access technology of the plurality of access technologies. The first access technology is selected from the plurality of access technologies in accordance with the access technology selection profile.

17 Claims, 4 Drawing Sheets

(56) References Cited

U.S. PATENT DOCUMENTS

| | | | |
|---|---|---|---|
| 2013/0208696 A1* | 8/2013 | Garcia Martin | H04W 36/32 |
| | | | 370/331 |
| 2015/0195862 A1 | 7/2015 | Naqvi et al. | |
| 2015/0289141 A1* | 10/2015 | Ghasemzadeh | H04W 16/14 |
| | | | 370/330 |
| 2017/0078895 A1* | 3/2017 | Sriram | H04W 24/02 |
| 2017/0099587 A1 | 4/2017 | Patel et al. | |

* cited by examiner

SYSTEM AND METHOD FOR ALTERNATE ACCESS PATHS IN A PUSH-TO-TALK (PTT) PLATFORM

CROSS-REFERENCE TO RELATED APPLICATIONS

The present application is related to and claims benefit under 35 U.S.C. § 119(e) from U.S. Provisional Patent Application Ser. No. 62/400,444, filed on Sep. 27, 2016, the entire contents of which being incorporated herein by reference.

BACKGROUND OF THE INVENTION

Push-to-talk (PTT) platforms involve providing PTT functionality (e.g., call group management, call origination, call transmittal, talk-back call termination, floor management, filtering, etc.) through PTT clients on client devices. The PTT functions may be performed by one or more servers, and communications between the client devices and the servers may be performed over a telecommunications network (e.g., a carrier network).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with an embodiment, a method includes defining, by a server of a services platform, an access technology selection profile for a client on a client device, wherein the access technology selection profile defines a priority order for selecting, by the client, at least one of a plurality of access technologies to access one or more telecommunications services provided by the services platform; transmitting, by the server, the access technology selection profile to the client; and providing, by the server, a first telecommunications service of the one or more telecommunications services to the client using a first access technology of the plurality of access technologies, wherein the one or more telecommunications services includes a push-to-talk (PTT) service, and wherein the first access technology is selected from the plurality of access technologies in accordance with the access technology selection profile. In an embodiment, the access technology selection profile is specific to the client device and is defined in accordance with access technologies available to the client device, usage patterns of the client, one or more parameters defined in a User Agent Profile (UAProf) corresponding to the client, or a combination thereof. In an embodiment, the access technology selection profile further defines one or more switching conditions triggering the client to switch from the first access technology to a second access technology of the plurality of access technologies to access the first telecommunications service. In an embodiment, the method further includes monitoring one or more session parameters, wherein the one or more session parameters comprise one or more parameters of a channel, provided by the first access technology, to the client, one or more parameters of the first telecommunications service, or a combination thereof; and in response detecting the one or more session parameters meeting the one or more switching conditions, instructing the client to switch from the first access technology to a second access technology to access the first telecommunications service. In an embodiment, the access technology selection profile defines a plurality of different priority orders for selecting the at least one of the plurality of access technologies to access the one or more telecommunications services, and wherein the access technology selection profile further defines one or more priority conditions under which each of the different priority orders applies. In an embodiment, the one or more priority conditions include a minimum quality of service for the one or more telecommunications services, a type of the first telecommunications service, congestion levels of the plurality of access technologies, latency of the plurality of access technologies, battery usage mode of the client device, or a combination thereof. In an embodiment, the method further includes analyzing historic network data for each of the plurality of access technologies, wherein defining the access technology selection profile comprises defining the access technology selection profile in accordance with the historic network data for each of the plurality of access technologies. IN an embodiment, defining the access technology selection profile in accordance with the historic network data comprises defining a plurality of different priority orders for selecting the at least one of the plurality of access technologies to access the one or more telecommunications services in accordance with the historic network data, wherein each of the plurality of different priority orders corresponds to a different time of a day, day of a week, or a combination thereof. In accordance with an embodiment, a method includes receiving, by a client on a client device, an access technology selection profile from a server of a services platform, wherein a plurality of access technologies is available to the client for accessing one or more telecommunications services provided by the services platform, and wherein the one or more telecommunications services comprises a push-to-talk (PTT) call service; selecting, by the client, a first access technology of the plurality of access technologies to access the one or more telecommunications services in accordance with a priority order, defined by the access technology selection profile, for selecting at least one of a plurality of access technologies to access the one or more telecommunications services; and accessing, by the client, a first telecommunications service of the one or more telecommunications services using the first access technology. In an embodiment, the access technology selection profile further defines one or more switching conditions triggering the client to switch from the first access technology to a second access technology of the plurality of access technologies to access the one or more telecommunications services. In an embodiment, the one or more switching conditions comprises accessing, by the client, a second telecommunications service of the one or more telecommunications services. In an embodiment, the method further includes monitoring, by the client, one or more session parameters, wherein the one or more session parameters comprise one or more parameters of a channel, provided by the first access technology, to the client, one or more parameters of the first telecommunications service, or a combination thereof, and wherein the one or more switching conditions triggers the client to switch to the second access technology in response to a detection that the one or more session parameters falling below a threshold; and in response to the detection that the one or more session parameters falling below the threshold, switching, by the client, from the first access technology to the second access technology in accordance with the access technology selection profile. In an embodiment, the one or more session parameters comprise voice quality, jitter, latency, error rate, re-transmission rate, or a combination thereof. In an embodiment, accessing, by the client, the first telecommunications service of using the first access technology comprises adapting a communications parameter, protocol, or a combination thereof for communications of the first telecommunications service in accordance with the first access technology. In an embodiment, the first access technology is a higher latency network than a second access technology of the plurality of access technologies, and wherein adapting a communications parameter, protocol, or a combination thereof for communications of the first telecommunications service in accordance with the first access technology comprises using a user datagram protocol (UDP) for the communications, using an encryption-free transport protocol for the communications, delaying data synchronization of at least one type of data with the server until the client is connected to the second access technology, extending one or more timers for the communications, not transmitting static information with each packet of the communications, increasing real time transport protocol packet aggregation for the communications, using a higher compression codec for the communications, applying noise and silence suppression techniques for the communications, or a combination thereof. In an embodiment, the method further includes monitoring a link quality of a connection provided by the first access technology; and adapting a codec rate of the communications in accordance with the link quality. In an embodiment, the one or more timers comprise a network address translation (NAT) timer, a SIP stack re-transmission timer, a REFER message timeout, a re-transmission timer for floor control of the PTT call service, or a combination thereof. In an embodiment, the first access technology is a radio access network (RAN), and wherein adapting the communications parameter, protocol, or a combination thereof comprises throttling a transmission of the communications, adjusting a quality of service (QoS) profile for the client in accordance with a PTT transmission, adjusting a long term evolution (LTE) bearer for the client in accordance with PTT transmissions, selecting modulation and coding schemes (MCS) for the communications in accordance with an estimated channel quality between the client device and the RAN, selecting packetization rates for the communications in accordance with the estimated channel quality between the client device and the RAN, reducing codec frame rates for the communications when RAN congestion is detected in a cell where the client device is located, reducing a number of acknowledgment receipts transmitted when RAN congestion is detected in a cell where the client device is located, or a combination thereof. In an embodiment, the one or more telecommunications services further comprises audio transmissions, multimedia transmissions, data file transmission, location information transmissions, text transmissions, or a combination thereof.

In accordance with an embodiment, A client device includes a transceiver configured to receive an access technology selection profile from a server of a services platform, wherein a plurality of access technologies is available to the client for accessing one or more telecommunications services provided by the services platform, and wherein the one or more telecommunications services comprises a push-to-talk (PTT) call service; a memory configured to store the access technology selection profile; and an electronic processor configured to: select a first access technology of the plurality of access technologies to access the one or more telecommunications services in accordance with a priority order, defined by the access technology selection profile, for selecting at least one of a plurality of access technologies to access the one or more telecommunications services; and access a first telecommunications service of the one or more telecommunications services using the first access technology. In an embodiment, the electronic processor is further configured to: monitor one or more connection quality parameters of a connection provided by the first access technology, wherein the access technology selection profile further defines one or more switching conditions triggering the client to switch from the first access technology to a second access technology of the plurality of access technologies to access the one or more telecommunications services, wherein the one or more switching conditions triggers the client to switch to the second access technology in response to a detection that the one or more connection quality parameters falls below a threshold; and adapt a communications parameter, protocol, or a combination thereof for communications of the first telecommunications service in accordance with the first access technology.

Various embodiments are described within a specific context, namely, access path selection in a push-to-X (PTX) system. Various embodiments may, however, be applied to other systems and networks where access path selection is desirable.

Figure 1:
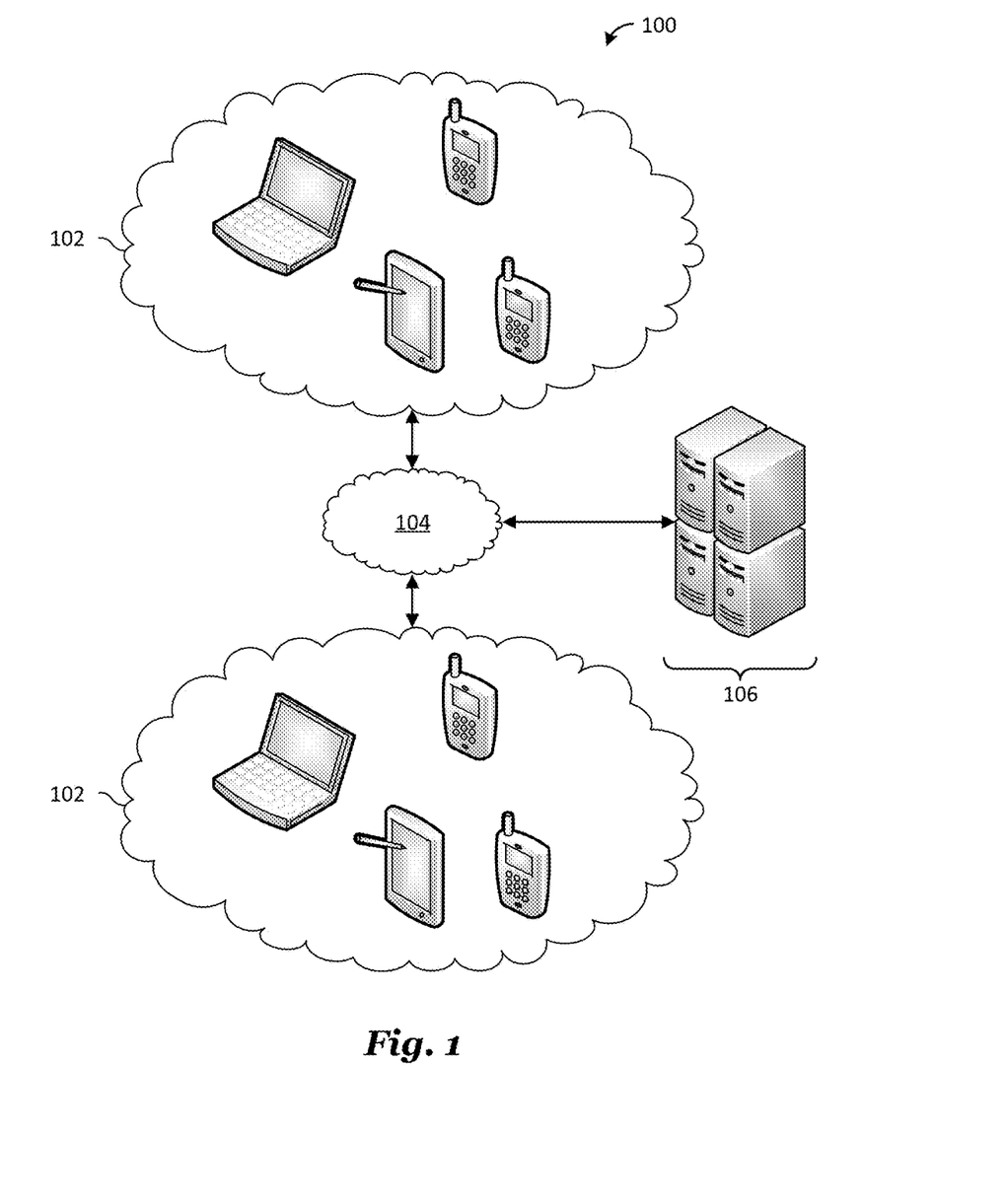
FIG. 1 illustrates a diagram of an embodiment communications network in accordance with some embodiments.

FIG. 1 illustrates a communications system 100, which provides an architecture for supporting a PTX communications solution in accordance with some embodiments. Communications system 100 includes client devices 102, a communications network 104, and a PTX platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on client devices 102 for accessing various PTX functions.

Generally, the PTX communications solution may provide one or more of the following functions: push-to-talk (PTT) call sessions (e.g., providing two-way half-duplex voice calls within a group of client devices 102), transmitting/receiving text messages, transmitting/receiving multimedia messages, transmitting/receiving data files, transmitting/receiving location information of client devices, transmitting/receiving audio data (e.g., including voice messages and/or voice mail), combinations thereof, or the like.

Client devices 102 may communicate with platform 106 over network 104, which may be accessed by client devices 102 through a cellular network deployed by a carrier, a WiFi network, a radio access network (RAN), a satellite network, other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

In an embodiment where telecommunications platform 106 is a PTT-over-Cellular (PoC) platform, subscribers to a PTX solution (e.g., users operating client devices 102) may be provisioned onto system 100 via interfaces to carriers (e.g., cellular carriers). PTX customers (e.g., enterprises) can administer these subscribers to form closed groups for PTX communications. The PTX solution may interface with the carrier, for example, by including connectivity to the carrier's core network, billing interfaces, provisioning interfaces, lawful intercept interfaces, customer care interfaces, and the like. PTX platform 106 may provide a plurality of PTX functions to client devices 102 through the PTX clients on client devices 102. Such functions may include one or more of: push-to-talk (PTT) call sessions (e.g., providing two-way half-duplex voice calls within a group of client devices 102), transmitting/receiving text messages, transmitting/receiving multimedia messages, transmitting/receiving data files, transmitting/receiving location information of client devices, transmitting/receiving audio data (e.g., including voice messages and/or voice mail), combinations thereof, or the like.

In some embodiments, telecommunication services platform 106 uses container technology for virtualization of a PTX system architecture, such as, the virtualization of provided PTT services. Example container technologies may include Docker, Rocket, LXD, and the like although the architecture is not limited to a specific container technology. Virtualization using container technology may allow platform 106 to adopt a micro-services model in which service clusters are considered the building blocks of the system architecture. For example, each function provided by platform 106 may be virtualized in a unique service cluster, and each service cluster may perform a different function in platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each service provided by the PTX platform) to be independently deployed and managed. Thus, system resilience may be improved as failures are localized to individual services. Furthermore, rapid and agile deployment of services may also be achieved.

In some embodiments, platform 106 incorporates distributed databases, clustering technologies, data analytics tools, and messaging middleware to provide a robust, scalable platform. Platform 106 may use fully virtualized components with a layered approach to service orchestration, which allows platform 106 to be integrated into various cloud environments, such as a carrier's private cloud infrastructure, a dedicated PTX cloud infrastructure, combinations thereof, and the like. Other telecommunication services platforms, including other platforms, may be used in other embodiments.

In some embodiments, a client on client device 102 may have the option to use any one of a plurality of access paths to communicate with telecommunications services platform 106 (e.g., a PTX platform) and/or other clients on other client devices 102. In an embodiment, network 104 may include different types of networks (e.g., different types of access technologies), and each type of network may provide independent capability for a client to communicate with telecommunications services platform 106 and/or other clients. By providing different access technologies to a client on a client device 102, the client may be capable of maintaining continuous connectivity with telecommunications services platform 106 and access various services provided by telecommunications services platform 106, such as PTX services (e.g., audio communications, multimedia communications, data file communications, location communications, text communications, combination thereof, and the like). For example, when a client loses connectivity with a first access technology, the client can still access services provided by telecommunications services platform 106 using one or more other second access technologies still available to the client.

Figure 2:
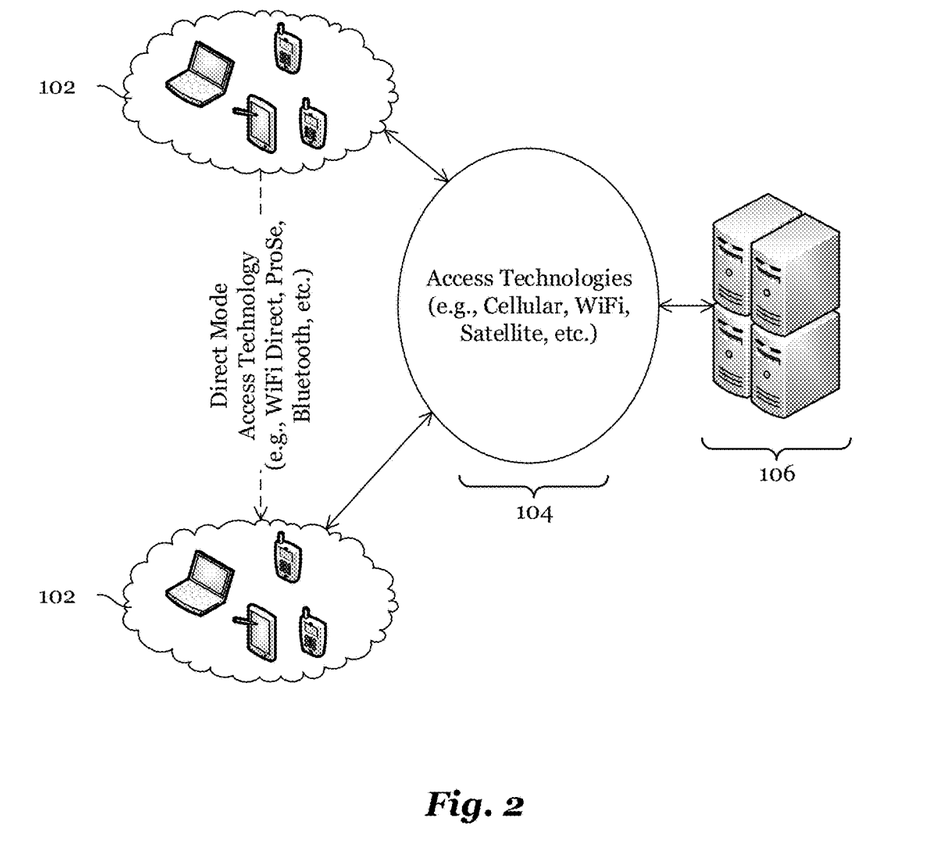
FIG. 2 illustrates a diagram of access technologies in accordance with some embodiments.

FIG. 2 illustrates some example access technologies, which may be available to a client on a client device 102 to access telecommunications services platform 106 and/or other clients on other client devices 102 using telecommunications services platform 106. Example access technologies include cellular technologies (e.g., 3G, 4G, LTE, 5G, or the like), WiFi networks, satellite technologies, direct mode communications (e.g., WiFi Direct, proximity services (ProSe), Bluetooth, or the like). In various embodiments, clients may use wide area network (WAN) access technologies (e.g., cellular technologies, WiFi networks, and satellite technologies) to communicate with servers of the telecommunications services platform 106, and the clients may use local area network (LAN) access technologies (e.g., direct mode communications) to communicate with other clients as part of a telecommunications service (e.g., during a PTT call and/or communicating data as part of a PTX service). In some embodiments, LAN access technologies are serverless technologies where client devices 102 communicate directly with each other without any intermediary devices (e.g., servers). In embodiments where direct mode communications are used, at least one client may optionally perform Relay Mode operations and forward one or more packets of a telecommunications service (e.g., a PTX service) between a server of platform 106 and one or more other clients over a LAN. In this manner, the coverage zone of the telecommunications services platform 106 can be extended, and clients with limited or no connectivity to a WAN can still access telecommunication services provided by platform

106 over the LAN. In embodiments, a client on a client device 102 may be capable of selection all of the example access technologies, a subset of the example access technologies, and/or other access technologies.

Various embodiments described herein provide mechanisms for a server to configure access technology selection profiles for clients registered with the server. Various embodiments described herein further provide mechanisms for a client on a client device 102 to monitor, select, adapt to, and connect to various access technologies (sometimes also referred to as access path) to access one or more services provided by telecommunication services platform 106. For example, embodiments provide mechanisms for the client to recognize the availability of the access technologies, select an access path that can support a requested service (e.g., a service provided by telecommunications services platform 106), connect to a selected access technology, and adapt to the transmission protocols of a selected access technology. Various embodiment clients may be capable of one or more of the following functionalities: monitor available access technologies, apply priority/preference rules for selection of an access path, assess suitability of selected access path to support services (e.g., a PTT call session) provided by platform 106, apply applicable protocol adaptations corresponding to a selected access path, and monitor connection quality with a selected access path for degradation and select an alternate access path when a monitored connection quality degrades as indicated by one or more parameters falling below one or more thresholds.

Figure 3:
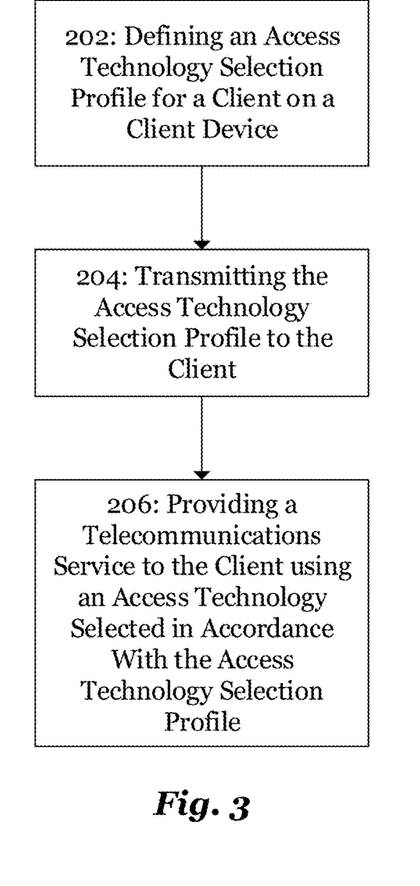
FIG. 3 illustrates a flow diagram of server operations in accordance with some embodiments.

An embodiment server of telecommunications services platform 106 may configure access technology selection profiles for clients on client devices 102 connected to platform 106. For example, FIG. 3 illustrates a flow chart of operations performed by a server of a telecommunications services platform in accordance with some embodiments. In block 202, a server of a telecommunications services platform (e.g., platform 106) defines an access technology selection profile for a client (e.g., a client on a client device 102). The access technology selection profile defines a priority order for selecting, by the client, at least one of a plurality of access technologies to access a telecommunications service provided by the telecommunications services platform. In some embodiments, the access technology selection profile provides one or more of the following: define one or more priority orders for selecting one or more access technologies available to a client to access a telecommunications service provided by the platform; define conditions under which a certain priority order for selecting the one or more access technologies applies; define one or more anchored access technologies (e.g., some clients may be required to be anchored, e.g., maintain a persistent connection when available, to one or more particular access technologies); define ability and conditions under which a user operating the client device 102 can override the access technology selection profile; define one or more conditions for switching from a first access technology to a second access technology; or the like. Example conditions under which certain priority order(s) apply for selecting the one or more access technologies include a minimum quality of service (QoS) required, congestion within one or more access technologies, latency of one or more access technologies, type of service being accessed, battery usage mode of the client device, combinations thereof, or the like.

For example, the access technology selection profile may prioritize access technologies capable of providing a minimum QoS to the client over other access technologies. In some embodiments, the access technology selection profile restricts the client from using an access technology that does not provide a minimum QoS.

As another example, the access technology selection profile may prioritize access technologies with lower detected levels of congestion over higher detected levels of congestion. In an embodiment, the access technology selection profile defines a first priority order when a congestion level of one or more first access technologies is within a first range (e.g., above a certain threshold) and a second priority order when the congestion level of the first access technologies is within a second range (e.g., below the threshold). In such embodiments, the second priority order is different than the first priority order. For example, the first priority order may prioritize second access technologies over the first access technologies while the second priority order may prioritize the first access technologies over the second access technologies.

As another example, different priority orders may be defined by the access technology selection profile based on the type of service accessed by the client. For example, certain types of services, such as transmitting/receiving multimedia messages, may use additional network resources. When such services are being accessed, a relatively low latency network (e.g., a cellular network) may be prioritized over a relatively high latency network (e.g., a satellite network).

As another example, a client device on which the client resides may be operating in a battery conservation mode, and the access technology selection profile may define a priority order based on power consumption levels of different access technologies. In an embodiment, cellular networks typically require less battery usage than WiFi networks, which require even less battery usage than direct mode communications. In such embodiments, the priority order defined, by the access technology selection profile, during the battery conservation mode can prioritize lower power consumption access technologies (e.g., cellular networks) over higher power consumption access technologies (e.g., WiFi or direct mode communications). Further, the priority order defined, by the access technology selection profile, during the battery conservation mode can be different than a priority order defined, by the access technology selection profile, when the client device is operating outside of battery conservation mode.

In some embodiments, the access technology selection profile may be client-specific. For example, the server may select an access technology selection profile for a particular client on a particular client device based on access technologies available to the client device, usage patterns of the client, one or more parameters defined in a User Agent Profile (UAProf) corresponding to the client, combinations thereof, or the like. Further, the server may configure a same access technology selection profile or different access technology selection profiles for different clients registered with the server. The server may be informed of access technologies available to the client, for example, by reports transmitted to the server from the client (or other monitoring server), and the server may further be informed of usage patterns of a client, for example, by monitoring historic usage data of the client.

In some embodiments, access technology selection profiles may further be defined in accordance with historic network data, such as, historic network usage data across an entire network or across different locations (e.g., cells) of the network. For example, the server may monitor and analyze usage information of different access technologies, such as, identifying access technology type, usage type (e.g., type of service accessed), and time of day used to access platform 106 across the entire network or across a particular area. In response to the monitored usage information, the access technology may define different categories of usage (e.g., high, medium, or low usage) for each of the different access technologies at different time periods (e.g., time of day, day of the week, combinations thereof, or the like) and/or different usage types (e.g., some services provided by platform 106 may use less network resources than others). In some embodiments, a plurality of different priority orders for selecting at least one of a plurality of access technologies may be defined to correspond to different times of day, type of usage, physical location of the client device, or the like. For example, the server may predict that a first access network has historically higher usage in a first time period than a second access network while the second access network has historically higher usage than the first access network in a second time period. In such embodiments, the server may define the access technology selection profile to have a first priority order (e.g., prioritizing the second access network over the first access network) during the first time period and a second priority order (e.g., prioritizing the first access network over the second access network) during the second time period. A similar analysis may be used to provide different priority orders in an access technology selection profile based on type of network usage, location, or the like.

In some embodiments, the server continuously monitors network usage from different clients accessing services provided by the server, and the server may update one or more access technology selection profiles of the clients based on monitored network usage. Updated access technology selection profiles may then be transmitted to the clients periodically by the server. In some embodiments, the updated access technology selection profiles may be piggybacked with other messages transmitted by the server to a client (e.g., during registration of the client with the server or during login of the client to the server) or transmitted as a dedicated message.

Furthermore, the server may restrict access to only certain access technologies in the access technology selection profile. For example, the server may allow access over LTE networks and WiFi networks but not satellite networks. Restricted access to different types of access technologies may depend on the type of service a client is attempting to access. For example, higher latency networks (e.g., a satellite network or other network with average end-to-end latency greater than 150 ms) may be unable to support the transmitting/receiving of multimedia messages, and thus, the access technology selection profile may restrict accessing multimedia based services provided by the platform using the higher latency networks.

In block 204, the server transmits the access technology selection profile corresponding to the client to the client. Each access technology selection profile may be used by the client to influence the selection of an access technology for the client to access a service provided by the platform. In some embodiments, the access technology selection profile may be piggybacked with other messages transmitted by the server to a client (e.g., during registration of the client with the server or during login of the client to the server) or transmitted as a dedicated message.

Subsequently, in block 206, the server provides a telecommunications service to the client using an access technology selected by the client in accordance with the access technology selection profile. In some embodiments, the server may further monitor a connection quality provided by the selected access technology. For example, the server may monitor one or more parameters of the communications channel and/or of the service (referred to as session parameters). Session parameters may include voice quality (e.g., of a PTT service), latency, error rate, re-transmission rate, combinations thereof, or the like. When one or more session parameters fall below one or more preset thresholds (e.g., voice quality threshold(s), latency threshold(s), error rate threshold(s), re-transmissions rate threshold(s), combinations thereof, or the like), the server may instruct the client to switch to an alternate access technology (e.g., based on the priority order defined in the access technology selection profile) to access the provided service. In some embodiments, the instruction to switch to the alternate access technology may or may not be transmitted during an active service (e.g., during an active PTT call session).

Figure 4:
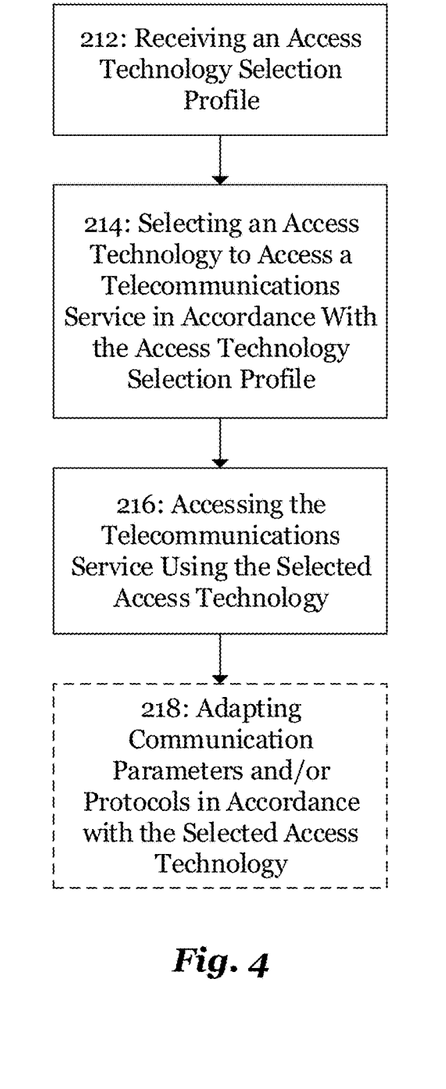
FIG. 4 illustrates a flow diagram of client operations in accordance with some embodiments.

An embodiment client on a client device 102 may select an access technology for accessing services provided by telecommunications services platform 106 in accordance with an access technology selection profile. For example, FIG. 4 illustrates a flow chart of operations performed by a client on a client device (e.g., client device 102) in accordance with some embodiments. In block 212, the client receives an access technology selection profile from a server of a services platform (e.g., platform 106). A plurality of access technologies is available to the client for accessing one or more telecommunications services provided by the services platform. As discussed above, the access technology selection profile may define one or more priority orders for selecting one or more access technologies available to a client to access a telecommunications service provided by the platform; define conditions under which a certain priority order for selecting the one or more access technologies applies; define one or more anchored access technologies; define ability and conditions under which a user operating the client device 102 can override the access technology selection profile; define one or more conditions for switching from a first access technology to a second access technology; combinations thereof; or the like. In some embodiments, the access technology selection profile may be piggybacked with other messages transmitted by the server to the client (e.g., during registration of the client with the server or during login of the client to the server) or received as a dedicated message.

In block 214, the client selects an access technology from the plurality of access technologies available to the client in order to access the one or more telecommunications services in accordance with the access technology selection profile. Selection of the access technology may include determining access technologies currently available to the client and selecting an access technology from the available access technologies to access the service in accordance with a suitable priority order defined by the access technology selection profile. In various embodiments, the access technology selection profile may define different priority orders under different conditions as discussed above (e.g., a minimum quality of service (QoS) required, congestion within one or more access technologies, type of service desired to be accessed, latency of one or more access technologies, battery usage mode of the client device, time period (e.g., time of day, day of the week, or the like), combinations thereof, or the like). For example, certain access technologies may not be capable of supporting every service provided by the platform, and the access technology selection profile may exclude the selection of unsuitable access technologies for certain services. The client may determine current conditions of the client and select a particular priority order defined by the access technology selection profile based on the conditions.

In block 216, the client accesses the telecommunications service provided by the platform using the selected access technology. In some embodiments, the client may optionally adapt communication parameters and/or protocols (also referred to as transmission parameters) in accordance with the selected access technology (block 218). Block 218 is optional as indicated by the dashed outline in FIG. 4. Transmission parameter adaptations may be selected based on characteristics of a particular access technology. For example, for historically high latency access technologies (e.g., satellite networks), the protocols and codecs for communications may be adapted in accordance with the expected high latency (e.g., end-to-end latency greater than about 150 ms). In some embodiments, adapting communication protocols/codecs for high latency networks may include one or more of the following: selecting an appropriate transport protocol (e.g., user datagram protocol (UDP) instead of transmission control protocol (TCP) for media and call signaling; selecting an encryption-free transport protocol, a combination thereof, or the like); delaying data synchronization with platform 106 for certain types of data (e.g., contacts, group, presence, location, maps, configurations, periodic session initiation protocol (SIP) refreshes, combinations thereof, or the like) until client device 102 connects to platform 106 using a lower latency network; extending timers (e.g., network address translation (NAT) timers, SIP stack re-transmission timers, REFER message timeout, re-transmission timers for Floor control, combinations thereof, or the like); caching static information (e.g., codec payload header compression, real-time transport protocol (RTP) header compressing, combinations thereof, or the like) and not transmitting static information with each packet, increasing RTP packet aggregation (e.g., increased from 6-7 frames/packet to 15-20 frames/packet), using a high compression codec (e.g., Codec2, advanced multiband excitation (AMBE) 3.2 kbps, etc.); applying noise and/or silence suppression techniques (e.g., not transmitting packets when a detected volume of audio data is below a threshold); monitoring link quality between the client and the server and reducing codec rates based on monitored quality; and the like. The link quality may be monitored by determining a Kodiak™ Call Session Quality Indicator (CSQI) for the PTT session. In response to the detected link quality parameter(s), codec rates may be adapted accordingly.

As another example, for WiFi networks, communication protocols may be adapted to get through security protocols (e.g., corporate firewalls). As another example, for cellular networks, radio access network (RAN) resource management procedures may be invoked. Examples of RAN resource management may include throttling certain transmissions at the PTT server and/or client device 102, adjusting QoS profiles/LTE bearers for PTT transmissions, selecting modulation and coding schemes (MCS)/packetization rates based on estimated channel quality between the client device 102 and the RAN, reducing codec frame rates when RAN congestion is detected in a cell where the client device 102 is located, reducing the number of transmissions (e.g., acknowledgement (ACK) receipts) to the client device 102 when RAN congestion is detected in a cell where the client device 102 is located, combinations thereof, or the like.

In some embodiments, the access technology selection profile further defines one or more switching conditions triggering the client to switch from the access technology to a different access technology of the plurality of access technologies available to the client to access telecommunications services provided by the services platform. In an embodiment, the switching conditions comprises client accessing a different service provided by the platform. The client may switch to a different access technology based on a service type of the new service. For example, the new service may not be supported by an access technology used by the client to communicate with the platform, and the client may switch to an access technology capable of supporting the new service.

In some embodiments, the client may monitor the quality of connection provided by the selected access technology while the client participates in an active service (e.g., an active PTT call session). Monitoring the connection quality provided by the selected access technology may include monitoring parameters related to session quality (e.g., voice quality, latency, error rate, re-transmission rate, combinations thereof, or the like) of the telecommunications service (e.g., a PTT session). Monitoring the session quality may further include monitoring a link quality provided by the selected access technology (e.g., between the client and the server or another client), such as using a CSQI as described in patent application Ser. No. 15/331,042. In such embodiments, the switching condition may include the session parameters falling below certain preset thresholds (e.g., voice quality threshold(s), latency threshold(s), error rate threshold(s), re-transmissions rate threshold(s), CSQI thresholds, combinations thereof, or the like). Based on a detection that a switching condition is met (e.g., a monitored parameter falling below a threshold), the client device 102 may seek to connect to an alternate access path (e.g., based on the priority order defined in the access technology selection profile). In some embodiments, the client may switch to the alternate technology during an active service (e.g., during an active PTT call session).

In other embodiments, the monitoring of session parameters may be performed by the server, which transmits an instruction to switch to an alternate access technology to the client when the session parameters fall below a threshold. In response to receiving an instruction to switch to an alternate access technology, the client may connect to an alternate access path (e.g., based on the priority order defined in the access technology selection profile). In some embodiments, the client may receiving the switching instruction and switch to the alternate technology during an active service (e.g., during an active PTT call session).

Figure 5:
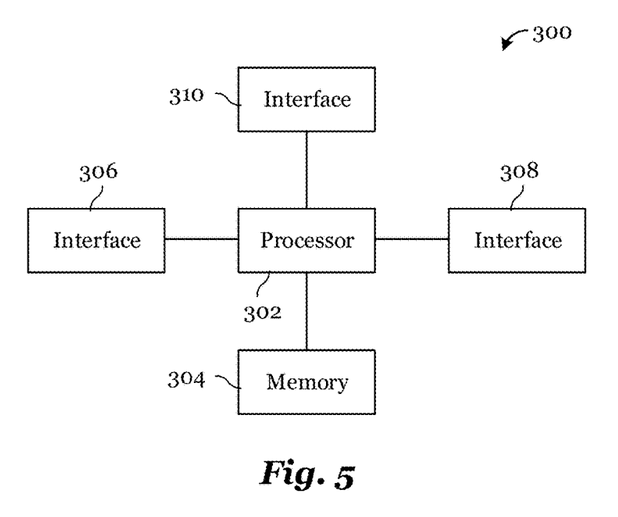
FIG. 5 illustrates a diagram of a processing system in accordance with some embodiments.

FIG. 5 illustrates a block diagram of an embodiment processing system 300 for performing methods described herein, which may be installed in a host device. As shown, the processing system 300 includes an electronic processor 304, a memory 306, and interfaces 310-314, which may (or may not) be arranged as shown in FIG. 5. The processor 304 may be any component or collection of components adapted to perform computations and/or other processing related tasks, and the memory 306 may be any component or collection of components adapted to store programming and/or instructions for execution by the processor 304. In an embodiment, the processor 304 is a component of an embodiment server and is configured to define an access technology selection profile for an embodiment client as described above; provide one or more telecommunications services (e.g., a PTT session) to the client as described above; monitor one or more session parameters of the telecommunications service(s) provided to the client as described above; analyze historic network data for access technologies used by clients accessing the telecommunication service(s) provided by the processor as described above;

combinations thereof; or the like. In an embodiment, the processor 304 is a component of a client device, which is configured to run a client as described above. In such embodiments, the processor 304 may be configured to select an access technology to access one or more telecommunications services in accordance with an access technology selection profile as described above; participate in one or more telecommunications services (e.g., a PTT session) provided to the client as described above; monitor one or more session parameters of the telecommunications service(s) provided to the client and switch to a different access technology when the one or more session parameters fall below a threshold as described above; adapting a communications parameter/protocol in accordance with a selected access technology when accessing the telecommunication service(s) as described above; maintain an anchored access technology connection when available as described above; combinations thereof; or the like. In an embodiment, the memory 306 includes a non-transitory computer readable medium. In an embodiment, the memory 306 stores an access technology selection profile as described above. In such embodiments, the processor 304 may be configured to retrieve the access technology selection profile stored in the memory 306 and select an access technology in accordance with the retrieved access technology selection profile. As another example, the processor may store a defined access technology selection profile in the memory 306 for transmission to a client. The interfaces 310, 312, 314 may be any component or collection of components that allow the processing system 300 to communicate with other devices/components and/or a user. For example, one or more of the interfaces 310, 312, 314 may be adapted to communicate data, control, or management messages from the processor 304 to applications installed on the host device and/or a remote device. As another example, one or more of the interfaces 310, 312, 314 may be adapted to allow a user or user device (e.g., personal computer (PC), etc.) to interact/communicate with the processing system 300. The processing system 300 may include additional components not depicted in FIG. 5, such as long term storage (e.g., non-volatile memory, etc.).

In some embodiments, the processing system 300 is included in a network device that is accessing, or part otherwise of, a telecommunications network. In one example, the processing system 300 is in a network-side device in a wireless or wireline telecommunications network, such as a base station, a relay station, a scheduler, a controller, a gateway, a router, an applications server, or any other device in the telecommunications network. In other embodiments, the processing system 300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 6:
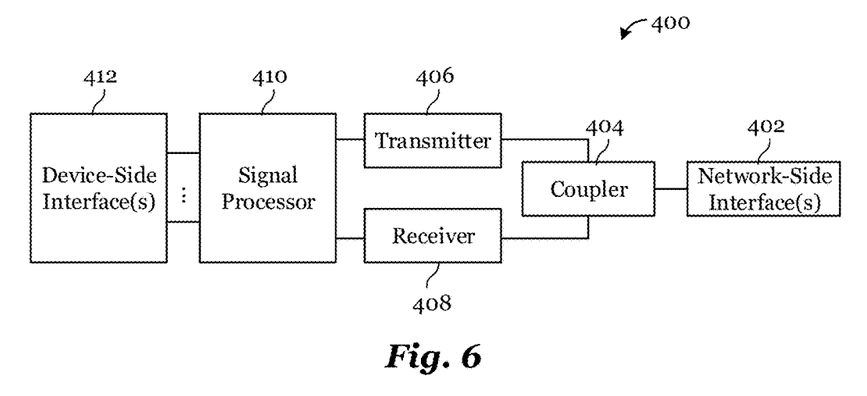
FIG. 6 illustrates a diagram of a transceiver in accordance with some embodiments.

In some embodiments, one or more of the interfaces 310, 312, 314 connects the processing system 300 to a transceiver adapted to transmit and receive signaling over the telecommunications network. FIG. 6 illustrates a block diagram of a transceiver 400 adapted to transmit and receive signaling over a telecommunications network. In an embodiment, the transceiver 400 transmits or receives access technology selection profiles as described above depending on whether the transceiver 400 is part of a server or a client device. In some embodiments, an access technology profile received, by the transceiver 400, may be stored in the memory of a client device, or the transceiver may retrieve the access technology selection profile from the memory of a server and transmit to a client device. The transceiver 400 may be installed in a host device. As shown, the transceiver 400 comprises a network-side interface 402, a coupler 404, a transmitter 406, a receiver 408, a signal processor 410, and a device-side interface 412. The network-side interface 402 may include any component or collection of components adapted to transmit or receive signaling over a wireless or wireline telecommunications network. The coupler 404 may include any component or collection of components adapted to facilitate bi-directional communication over the network-side interface 402. The transmitter 406 may include any component or collection of components (e.g., up-converter, power amplifier, etc.) adapted to convert a baseband signal into a modulated carrier signal suitable for transmission over the network-side interface 402. The receiver 408 may include any component or collection of components (e.g., down-converter, low noise amplifier, etc.) adapted to convert a carrier signal received over the network-side interface 402 into a baseband signal. The signal processor 410 may include any component or collection of components adapted to convert a baseband signal into a data signal suitable for communication over the device-side interface(s) 412, or vice-versa. The device-side interface(s) 412 may include any component or collection of components adapted to communicate data-signals between the signal processor 410 and components within the host device (e.g., the processing system 300, local area network (LAN) ports, etc.).

The transceiver 400 may transmit and receive signaling over any type of communications medium. In some embodiments, the transceiver 400 transmits and receives signaling over a wireless medium. For example, the transceiver 400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 402 comprises one or more antenna/radiating elements. For example, the network-side interface 402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    defining, by a server of a services platform, an access technology selection profile for a client on a client device, wherein the access technology selection profile defines a priority order for selecting, by the client, at least one of a plurality of access technologies to access one or more telecommunications services provided by the services platform;
    transmitting, by the server, the access technology selection profile to the client;
    providing, by the server, a first telecommunications service of the one or more telecommunications services to the client using a first access technology of the plurality of access technologies, wherein the one or more telecommunications services includes a push-to-talk (PTT) service, and wherein the first access technology is selected from the plurality of access technologies in accordance with the access technology selection profile, wherein the access technology selection profile further defines one or more switching conditions triggering the client to switch from the first access technology to a second access technology of the plurality of access technologies to access the first telecommunications service;
    monitoring, by the client, one or more session parameters, wherein the one or more session parameters comprise one or more parameters of a channel, provided by the first access technology, to the client; and
    switching, by the client, from the first access technology to the second access technology to access the first telecommunications service when the client detects that the one or more session parameters meets the one or more switching conditions.

2. The method of claim 1, wherein the access technology selection profile is specific to the client device and is defined in accordance with access technologies available to the client device, usage patterns of the client, one or more parameters defined in a User Agent Profile (UAProf) corresponding to the client, or a combination thereof.

3. The method of claim 1, wherein the access technology selection profile defines a plurality of different priority orders for selecting the at least one of the plurality of access technologies to access the one or more telecommunications services, and wherein the access technology selection profile further defines one or more priority conditions under which each of the different priority orders applies.

4. The method of claim 3, wherein the one or more priority conditions include a minimum quality of service for the one or more telecommunications services, a type of the first telecommunications service, congestion levels of the plurality of access technologies, latency of the plurality of access technologies, battery usage mode of the client device, or a combination thereof.

5. The method of claim 1 further comprises analyzing historic network data for each of the plurality of access technologies, wherein defining the access technology selection profile comprises defining the access technology selection profile in accordance with the historic network data for each of the plurality of access technologies.

6. The method of claim 5, wherein defining the access technology selection profile in accordance with the historic network data comprises defining a plurality of different priority orders for selecting the at least one of the plurality of access technologies to access the one or more telecommunications services in accordance with the historic network data, wherein each of the plurality of different priority orders corresponds to a different time of a day, day of a week, or a combination thereof.

7. A method comprising:
receiving, by a client on a client device, an access technology selection profile from a server of a services platform, wherein a plurality of access technologies is available to the client for accessing one or more telecommunications services provided by the services platform, wherein the access technology selection profile further defines one or more switching conditions triggering the client to switch from a first access technology to a second access technology of the plurality of access technologies to access the one or more telecommunications services, and wherein the one or more telecommunications services comprises a push-to-talk (PTT) call service;
selecting, by the client, the first access technology of the plurality of access technologies to access the one or more telecommunications services in accordance with a priority order, defined by the access technology selection profile, for selecting at least one of a plurality of access technologies to access the one or more telecommunications services;
accessing, by the client, a first telecommunications service of the one or more telecommunications services using the first access technology;
monitoring, by the client, one or more session parameters, wherein the one or more session parameters comprise one or more parameters of a channel, provided by the first access technology, to the client and wherein the one or more switching conditions triggers the client to switch to the second access technology in response to a detection that the one or more session parameters falling below a threshold; and
in response to the detection that the one or more session parameters falling below the threshold, switching, by the client, from the first access technology to the second access technology in accordance with the access technology selection profile.

8. The method of claim 7, wherein the one or more switching conditions comprises accessing, by the client, a second telecommunications service of the one or more telecommunications services.

9. The method of claim 7, wherein the one or more session parameters comprise voice quality, jitter, latency, error rate, re-transmission rate, or a combination thereof.

10. The method of claim 7, wherein accessing, by the client, the first telecommunications service of using the first access technology comprises adapting a communications parameter, protocol, or a combination thereof for communications of the first telecommunications service in accordance with the first access technology.

11. The method of claim 10, wherein the first access technology is a higher latency network than a second access technology of the plurality of access technologies, and wherein adapting a communications parameter, protocol, or a combination thereof for communications of the first telecommunications service in accordance with the first access technology comprises using a user datagram protocol (UDP) for the communications, using an encryption-free transport protocol for the communications, delaying data synchronization of at least one type of data with the server until the client is connected to the second access technology, extending one or more timers for the communications, not transmitting static information with each packet of the communications, increasing real time transport protocol packet aggregation for the communications, using a higher compression codec for the communications, applying noise and silence suppression techniques for the communications, or a combination thereof.

12. The method of claim 11 further comprising:
monitoring a link quality of a connection provided by the first access technology; and
adapting a codec rate of the communications in accordance with the link quality.

13. The method of claim 11, wherein the one or more timers comprise a network address translation (NAT) timer, a SIP stack re-transmission timer, a REFER message timeout, a re-transmission timer for floor control of the PTT call service, or a combination thereof.

14. The method of claim 10, wherein the first access technology is a radio access network (RAN), and wherein adapting the communications parameter, protocol, or a combination thereof comprises throttling a transmission of the communications, adjusting a quality of service (QoS) profile for the client in accordance with a PTT transmission, adjusting a long term evolution (LTE) bearer for the client in accordance with PTT transmissions, selecting modulation and coding schemes (MCS) for the communications in accordance with an estimated channel quality between the client device and the RAN, selecting packetization rates for the communications in accordance with the estimated channel quality between the client device and the RAN, reducing codec frame rates for the communications when RAN congestion is detected in a cell where the client device is located, reducing a number of acknowledgment receipts transmitted when RAN congestion is detected in a cell where the client device is located, or a combination thereof.

15. The method of claim 7, wherein the one or more telecommunications services further comprises audio transmissions, multimedia transmissions, data file transmission, location information transmissions, text transmissions, or a combination thereof.

16. The method of claim 7, wherein the access technology selection profile defines an anchored access technology for the client, and wherein the client maintains a persistent connection with the anchored access technology when the anchored access technology is available to the client.

17. A client device comprising:
a transceiver configured to receive an access technology selection profile from a server of a services platform, wherein a plurality of access technologies is available to the client for accessing one or more telecommunications services provided by the services platform, wherein the access technology selection profile further defines one or more switching conditions triggering the client to switch from a first access technology to a second access technology of the plurality of access technologies to access the one or more telecommunications services, and wherein the one or more telecommunications services comprises a push-to-talk (PTT) call service;

a memory configured to store the access technology selection profile; and an electronic processor configured to:
select the first access technology of the plurality of access technologies to access the one or more telecommunications services in accordance with a priority order, defined by the access technology selection profile, for selecting at least one of a plurality of access technologies to access the one or more telecommunications services;

access a first telecommunications service of the one or more telecommunications services using the first access technology; and monitor one or more connection quality parameters of a connection provided by the first access technology, wherein the one or more switching conditions triggers the client to switch to the second access technology in response to a detection that the one or more connection quality parameters falls below a threshold.

* * * * *